United States Patent
Hofler et al.

(10) Patent No.: US 8,550,960 B2
(45) Date of Patent: Oct. 8, 2013

(54) METHOD FOR THE OPERATION OF A CLUTCH OF A HYDRODYNAMIC TORQUE CONVERTER

(75) Inventors: Hans Hofler, Immenstaad (DE); Thomas Kurz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 276 days.

(21) Appl. No.: 13/124,841

(22) PCT Filed: Sep. 29, 2009

(86) PCT No.: PCT/EP2009/062596
§ 371 (c)(1),
(2), (4) Date: Apr. 19, 2011

(87) PCT Pub. No.: WO2010/046207
PCT Pub. Date: Apr. 29, 2010

(65) Prior Publication Data
US 2011/0197695 A1    Aug. 18, 2011

(30) Foreign Application Priority Data
Oct. 23, 2008    (DE) .................. 10 2008 043 108

(51) Int. Cl.
| F16H 45/02 | (2006.01) |
| F16H 61/14 | (2006.01) |
| B60W 10/02 | (2006.01) |
| B60W 10/04 | (2006.01) |
| F16D 33/00 | (2006.01) |
| F16D 35/00 | (2006.01) |
| F16D 37/00 | (2006.01) |

(52) U.S. Cl.
USPC ........... 477/169; 477/174; 477/180; 192/3.21

(58) Field of Classification Search
USPC ....... 477/169, 174–176, 180; 180/53.1–53.8; 192/3.21–3.33
See application file for complete search history.

(56) References Cited

U.S. PATENT DOCUMENTS

| 3,665,787 A | * | 5/1972 | Wilkinson .................. 477/33 |
| 3,985,046 A | | 10/1976 | Morris et al. |
| 4,246,997 A | | 1/1981 | Tarumizu |
| 4,640,394 A | | 2/1987 | Higashi et al. |
| 4,730,520 A | * | 3/1988 | Nishikawa et al. ............ 477/61 |
| 4,819,777 A | | 4/1989 | Yasue et al. |
| 4,835,694 A | | 5/1989 | Yamamoto et al. |
| 5,509,520 A | | 4/1996 | Evans et al. |
| 5,562,571 A | | 10/1996 | Maruyama et al. |
| 5,573,473 A | | 11/1996 | Asayama et al. |
| 5,621,643 A | | 4/1997 | Nakagami et al. |
| 5,681,238 A | | 10/1997 | Minowa et al. |

(Continued)

FOREIGN PATENT DOCUMENTS
| DE | 33 47 256 A1 | 7/1985 |
| DE | 35 17 381 A1 | 11/1985 |

(Continued)

*Primary Examiner* — Tisha Lewis
(74) *Attorney, Agent, or Firm* — Davis & Bujold, PLLC; Michael J. Bujold

(57) ABSTRACT

A clutch of a hydrodynamic torque converter, which connects the drive input of the hydrodynamic torque converter to the drive output of the hydrodynamic torque converter, is actuated in a disengaging direction when a power at an auxiliary power take-off in a vehicle exceeds a predefined value.

10 Claims, 1 Drawing Sheet

(56) References Cited

U.S. PATENT DOCUMENTS

| | | |
|---|---|---|
| 5,720,358 A | 2/1998 | Christensen et al. |
| 5,976,055 A | 11/1999 | Sasaki |
| 6,017,290 A | 1/2000 | Kinoshita et al. |
| 6,042,507 A | 3/2000 | Genise et al. |
| 6,099,435 A | 8/2000 | Halene et al. |
| 6,181,020 B1 | 1/2001 | Uchida et al. |
| 6,231,480 B1 * | 5/2001 | Sasaki ............... 477/174 |
| 6,234,254 B1 | 5/2001 | Dietz et al. |
| 6,253,140 B1 * | 6/2001 | Jain et al. ............ 701/67 |
| 6,306,061 B1 | 10/2001 | Inamura et al. |
| 6,314,357 B1 | 11/2001 | Kon et al. |
| 6,615,963 B2 | 9/2003 | Ono et al. |
| 6,997,851 B2 | 2/2006 | Hofler |
| 7,778,757 B2 | 8/2010 | Brattberg |
| 2004/0188168 A1 | 9/2004 | Aumann |
| 2004/0192505 A1 | 9/2004 | Leber et al. |
| 2007/0149354 A1 | 6/2007 | Ota et al. |
| 2008/0026905 A1 * | 1/2008 | Dickinson ............ 477/62 |
| 2008/0234906 A1 | 9/2008 | Warner |
| 2008/0242502 A1 | 10/2008 | Lin |
| 2009/0054206 A1 | 2/2009 | Tamba et al. |
| 2009/0105918 A1 * | 4/2009 | Kobayashi et al. ........ 701/67 |
| 2011/0202244 A1 * | 8/2011 | Hofler et al. ............ 701/60 |

FOREIGN PATENT DOCUMENTS

| | | |
|---|---|---|
| DE | 36 26 100 A1 | 2/1987 |
| DE | 37 12 498 A1 | 10/1987 |
| DE | 40 30 811 A1 | 4/1992 |
| DE | 44 27 359 A1 | 2/1995 |
| DE | 44 07 951 A1 | 9/1995 |
| DE | 195 21 458 A1 | 12/1995 |
| DE | 196 36 629 A1 | 3/1997 |
| DE | 198 20 047 A1 | 11/1998 |
| DE | 199 10 049 A1 | 9/1999 |
| DE | 199 25 414 A1 | 12/1999 |
| DE | 698 06 837 T2 | 4/2003 |
| DE | 698 20 922 T2 | 6/2004 |
| DE | 103 14 327 A1 | 10/2004 |
| DE | 103 14 334 A1 | 10/2004 |
| DE | 103 14 337 A1 | 10/2004 |
| DE | 600 08 957 T2 | 1/2005 |
| DE | 103 56 194 A1 | 7/2005 |
| DE | 60 2004 013 201 T2 | 7/2009 |
| EP | 0 907 043 A1 | 4/1999 |
| EP | 1 188 960 A2 | 3/2002 |
| EP | 1 801 294 A1 | 6/2007 |
| FR | 2 557 518 A1 | 7/1985 |
| WO | 2006/011832 A1 | 2/2006 |
| WO | 2006/017902 A1 | 2/2006 |

* cited by examiner

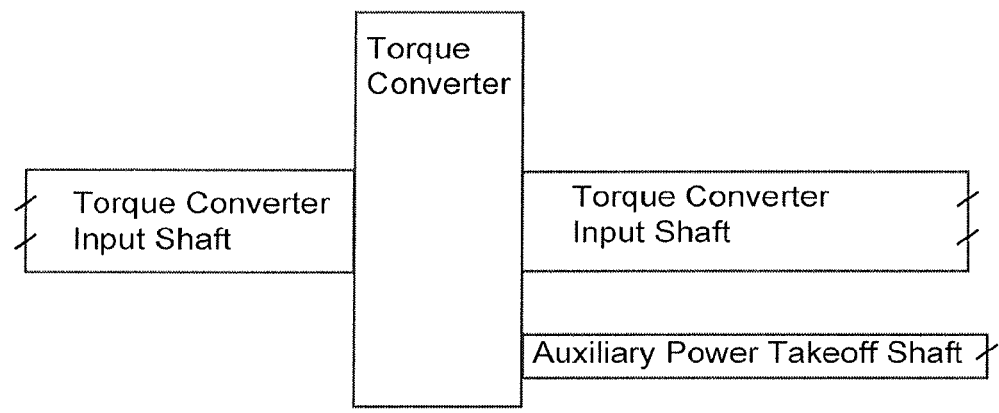

METHOD FOR THE OPERATION OF A CLUTCH OF A HYDRODYNAMIC TORQUE CONVERTER

This application is a National Stage completion fo PCT/EP2009/062596 filed Sep. 29, 2009, which claims priority from German patent application serial no. 10 2008 043 108.7 filed Oct. 23, 2008.

FIELD OF THE INVENTION

The invention relates to a method for actuating a clutch of a hydrodynamic torque converter.

BACKGROUND OF THE INVENTION

Clutches of the type used in torque converters are actuated in an engaging direction in order to connect the drive input of the torque converter to its drive output, whereby a direct driving connection from the drive input to the drive output is formed, which results in improved efficiency. Such clutches are often actuated in the engaging direction if the turbine torque and the pump torque have almost the same value with the clutch engaged or disengaged. This shifting point is determined from the rotation speed difference between the pump wheel and the turbine wheel of the hydrodynamic torque converter.

Working machines, such as agricultural vehicles, or building machinery, such as wheel loaders, additionally comprise an auxiliary power take-off which is in active connection with the drive input of the torque converter.

DE 33 47 256 C2 discloses a control device for the bridging clutch of a hydrodynamic torque converter in which an auxiliary power take-off, in the form of a shaft, is driven by the drive engine and the bridging clutch is actuated in the disengaging direction if it is detected that the speed has fallen below the lowest power take-off shaft rotation speed.

SUMMARY OF THE INVENTION

The purpose of the present invention is to provide a method for actuating a clutch of a hydrodynamic torque converter, by means of which the clutch of the hydrodynamic torque converter can be used effectively.

This objective is achieved by a method of the type concerned for actuating the clutch of the hydrodynamic torque converter, said method also embodying the characterizing features specified in the principal claim.

According to the invention, the clutch of the hydrodynamic torque converter actuated in the engaging direction is then actuated in the disengaging direction if the power at the auxiliary power take-off exceeds a predefined value.

BRIEF DESCRIPTION OF THE DRAWING

The invention will now be described with reference to the sole FIG. which is a schematic representation of an embodiment of present invention.

DETAILED DESCRIPTION OF THE PREFERRED EMBODIMENTS

This makes it possible for the clutch of the hydrodynamic torque converter, as shown in the sole FIG., to be actuated in the engaging direction if, for example, a wheel loader drives with its scoop into the material to be moved and raises the scoop in order to fill it. In such a case, the auxiliary power take-off requires a high engine rotation speed in order to produce sufficient power for the working hydraulic system.

In a further embodiment of the invention, the driving status of the vehicle is detected and, if it is driving down hill, the clutch of the torque converter remains actuated in the engaging direction even if the power demand at the auxiliary power take-off is above the said predefined value if the transmission input torque is below a predefined torque or if the vehicle is moving at above a predefined speed. This ensures that when driving downhill, the braking torque of the drive engine can be put to use.

Preferably, the auxiliary power take-off is in the form of a hydraulic pump so that the power of the auxiliary power take-off can be determined by means of the hydraulic pressure of the pump and its rotational speed. The hydraulic pressure can be determined either directly at the hydraulic pump or in the lifting cylinders of the scoop of the wheel loader.

The power can also be determined from the pilot control pressure in the hydraulic system. The pressure can also be detected by a pressure switch to recognize if the predefined pressure has been exceeded.

In another embodiment of the invention, an electronic control unit, for example the transmission electronic system, controls the disengaging and engaging of the clutch of the hydrodynamic torque converter so that the signals, for example that of the pressure switch, the turbine and engine speed or the engine torque, are transmitted to the transmission electronic system.

In a further embodiment of the invention, the engine electronic system is connected to the transmission electronic system by means of CAN signals so that the engine electronic system transmits the engine torque to the transmission control unit and, from this engine torque, the latter detects downhill driving and thus controls the clutch of the torque converter so that it remains actuated in the engaging direction.

The invention claimed is:

1. A method of actuating a clutch of a hydrodynamic torque converter in a vehicle such that the clutch, when actuated in the engaging direction, connecting an drive input of the hydrodynamic torque converter to an drive output of the hydrodynamic torque converter, and the clutch, when actuated in the disengaging direction, separating the drive input from the drive output of the hydrodynamic torque converter, the method comprising the steps of:
   forming a permanent active connection between an auxiliary power take-off and the drive input, and
   actuating the clutch in the disengaging direction if the power at the auxiliary power take-off exceeds a predetermined value.

2. The method of actuating a clutch according to claim 1, further comprising the step of using a hydraulic pump as the auxiliary power take-off.

3. The method for actuating a clutch according to claim 2, further comprising the step of determining a power of the hydraulic pump by at least one of a hydraulic pressure of the pump and a rotation speed of the pump.

4. A method of actuating a clutch of a hydrodynamic torque converter in a vehicle such that the clutch, when actuated in the engaging direction, connecting an drive input of the hydrodynamic torque converter to an drive output of the hydrodynamic torque converter, and the clutch, when actuated in the disengaging direction, disconnecting the drive input from the drive output of the hydrodynamic torque converter, the method comprising the steps of:
   forming a permanent active connection between an auxiliary power take-off and the drive input;

actuating the clutch in the disengaging direction if the power at the auxiliary power take-off exceeds a predetermined value; and when the clutch is actuated in the disengaging direction, actuating the clutch in the engaging direction if the power of the auxiliary power take-off falls below the predetermined value and a torque of a turbine wheel is almost the same when the clutch is in an engaged condition and when the clutch is in a disengaged condition.

5. The method for actuating a clutch according to claim 1, further comprising the step of, when the vehicle is driving downhill, actuating the clutch in the disengaging direction only if the vehicle is moving at less than a predefined speed.

6. The method for actuating a clutch according to claim 1, further comprising the step of supplying a transmission input torque which is above a predefined torque value.

7. The method for actuating a clutch according to claim 1, further comprising the step of determining, via a transmission electronic unit, speeds of the drive input and the drive output and at least one of a brake pedal position and a brake pressure, and a torque of a drive motor to be utilized for controlling the clutch.

8. A method of actuating a clutch of a hydrodynamic torque converter in a vehicle such that the clutch, when actuated in the engaging direction, connecting an drive input of the hydrodynamic torque converter to an drive output of the hydrodynamic torque converter and the clutch, when actuated in the disengaging direction, disconnecting the drive input from the drive output of the hydrodynamic torque converter, the method comprising the steps of:

forming a permanent active connection between an auxiliary power take-off and the drive input;

actuating the clutch in the disengaging direction if the power at the auxiliary power take-off exceeds a predetermined value; and transmitting a torque of a drive motor, via a CAN signal, to a transmission electronic unit which uses the signal for detecting a downhill driving situation.

9. The method for actuating a clutch according to claim 3, further comprising the step of determining the hydraulic pressure either directly at the hydraulic pump or by lifting cylinders of a scoop of the vehicle.

10. The method for actuating a clutch according to claim 1 further comprising the step of determining a power of the auxiliary power take-off.

* * * * *